US009146548B2

(12) United States Patent
Chambers et al.

(10) Patent No.: US 9,146,548 B2
(45) Date of Patent: Sep. 29, 2015

(54) SYSTEM AND METHOD FOR ENERGY CONSUMPTION MANAGEMENT

(75) Inventors: Gregory L. Chambers, Decatur, GA (US); Edward M. Smith, Alpharetta, GA (US)

(73) Assignee: INTELLIGENT ENERGY SOLUTIONS, LLC, Alpharetta, GA (US)

( * ) Notice: Subject to any disclaimer, the term of this patent is extended or adjusted under 35 U.S.C. 154(b) by 0 days.

(21) Appl. No.: 12/757,494

(22) Filed: Apr. 9, 2010

(65) Prior Publication Data

US 2010/0262313 A1 Oct. 14, 2010

Related U.S. Application Data

(60) Provisional application No. 61/167,955, filed on Apr. 9, 2009, provisional application No. 61/232,989, filed on Aug. 11, 2009.

(51) Int. Cl.
*G05B 15/02* (2006.01)
*G06Q 10/04* (2012.01)
(52) U.S. Cl.
CPC ............... *G05B 15/02* (2013.01); *G06Q 10/04* (2013.01)
(58) Field of Classification Search
USPC ....................................................... 700/295
See application file for complete search history.

(56) References Cited

U.S. PATENT DOCUMENTS

| 5,566,084 | A | * | 10/1996 | Cmar ............................ 700/276 |
| 5,924,486 | A | | 7/1999 | Ehlers et al. |
| 6,216,956 | B1 | | 4/2001 | Ehlers et al. |
| 6,377,858 | B1 | * | 4/2002 | Koeppe ........................... 700/12 |
| 8,027,752 | B2 | * | 9/2011 | Castaldo et al. ............... 700/296 |
| 2002/0005667 | A1 | | 1/2002 | Ciliox et al. |
| 2002/0178047 | A1 | | 11/2002 | Or et al. |
| 2004/0002792 | A1 | | 1/2004 | Hoffknecht |
| 2005/0102068 | A1 | * | 5/2005 | Pimputkar et al. ............. 700/291 |
| 2007/0255461 | A1 | * | 11/2007 | Brickfield et al. ............. 700/295 |
| 2008/0077368 | A1 | | 3/2008 | Nasle |
| 2008/0177423 | A1 | | 7/2008 | Brickfield et al. |
| 2008/0262820 | A1 | | 10/2008 | Nasle |
| 2010/0033277 | A1 | | 2/2010 | Davis |
| 2010/0094475 | A1 | * | 4/2010 | Masters et al. ................. 700/292 |
| 2010/0131117 | A1 | * | 5/2010 | Mattiocco et al. ............. 700/295 |

FOREIGN PATENT DOCUMENTS

DE 696 09 466 T2 10/2003
GB 2473596 A 3/2011

* cited by examiner

*Primary Examiner* — Ryan Jarrett
(74) *Attorney, Agent, or Firm* — Arent Fox LLP

(57) ABSTRACT

An energy management system and method providing a holistic premise energy optimization and energy efficiency reclamation system comprised of an interconnected system of software, analytics and automated process that optimizes the energy generation and storage technologies, energy consumption, energy demand and energy utilization of energy consuming assets within a premise.

24 Claims, 7 Drawing Sheets

SYSTEM AND METHOD FOR ENERGY CONSUMPTION MANAGEMENT

CROSS REFERENCE TO RELATED APPLICATION

This application claims priority to U.S. Provisional Application No. 61/167,955, entitled METHOD, PROCESS AND TECHNOLOGY TO REMOTELY SERVICE RESIDENTIAL AND BUSINESS BUILDING ENVIRONMENTS, ELIMINATING ELECTRICITY, GAS AND WATER WASTE, IMPROVING PREMISE ENERGY EFFICIENCY, ENSURING COMFORT AND ASSET RELIABILITY, REDUCING PEAK ENERGY DEMAND AND CARBON EMISSIONS, MANAGING PREMISE ELECTRICITY GENERATION AND STORAGE TECHNOLOGIES, DYNAMICALLY LEARNING CONSUMER BEHAVIOR TO FURTHER OPTIMIZE PREMISE ASSETS AND, THEN MEASURING IMPROVEMENTS, filed Apr. 9, 2009, as well as U.S. Provisional Application No. 61/232,989, entitled HOLISTIC PREMISE ENERGY OPTIMIZATION AND ENERGY EFFICIENCY RECLAMATION WEB-ENABLED SOFTWARE AND SYSTEM, filed Aug. 11, 2009, the contents of each of which are incorporated herein by reference into the present application.

TECHNICAL FIELD

The present invention relates generally to a system and method for energy management and, more particularly, to a holistic energy optimization and efficiency system and method providing a process that optimizes the energy generation and storage technologies, energy consumption, energy demand and energy utilization of energy consuming assets within a building.

BACKGROUND OF THE INVENTION

Based on data from the Energy Information Administration ("EIA"), residential and commercial end users consume over 40% of all electricity produced in the United States. At the same time, the Department of Energy ("DOE") estimates that current energy inefficiencies in buildings result in electric system losses of up to 40%.

While residential users have experienced efficiency gains over the last decade from technology improvements in appliances and HVAC ("Heating, Ventilating, and Air Conditioning") systems, these gains have been largely offset by a 40% increase in the number of homes, a 49% increase in the use of air conditioning, a 72% increase in the size of homes, as well as a steady increase in the number of home electronic devices being used. The average United States home now has 26 consumer electrical products and there are an estimated 124,000,000 United States residences. Fifteen million new commercial buildings are forecasted to be constructed over the next decade.

Moreover, global demand for fuel sources such as coal and natural gas, the addition of more generating capacity, and required investments in new transmission and distribution infrastructure will only push energy prices even higher than they are in today's market. Renewable and conventional energy supply construction costs are going up across the board, energy fuel costs are rising, operating costs are increasing and, the significant costs of cleaning the climate will soon be predicted.

In conjunction with these ever-growing levels of energy consumption and continuing increases in energy costs, legislative and regulatory policies addressing energy efficiency, renewable energy supply, and carbon emissions are causing utilities to search for new technologies to deliver affordable, low carbon, reliable energy supply to their customers. Political and economic pressures to reduce carbon emissions and protect our climate from global warming continue to mount.

For example, the nation's economic reinvestment and recovery stimulus plan included over $40 billion in funding towards developing technologies for making the nation more energy efficient. This figure represents a ten-fold increase over any previous year in annual federal investments for energy efficiency. Over $6 billion is targeted for increasing home energy efficiency and expanding current state energy efficiency programs. Special "decoupling" provisions have been included in the plan ensuring utilities that they will recover revenues that may be lost should end users consume less electricity as a result of the utility's end user energy efficiency programs.

In addition, the U.S. Energy Policy Act of 2005 encouraged adopting energy pricing time-of-use ("TOU") rates to shape end user consumption behavior, reduce the need for expensive peaking generation and effectively increase grid utilization. Smart meters and advanced metering infrastructures ("AMI") are needed to implement these strategies. The government estimates that 50 million advanced meters, representing an estimated $1 billion in utility investment, will be in the pipeline by 2010.

The Energy Independence and Security Act of 2007 supported creating the smart grid through modernization of the nation's electricity transmission and distribution system. It is estimated that $1.5 trillion of investment in transmission and distribution infrastructure will be made by utilities between 2010 and 2030. In the second half of 2008, over $275 million of new private venture funding was invested in companies developing and manufacturing communication networks and other technologies for smart grid solutions.

Generally, these smart grid initiatives aim at improving efficiencies in the utilities production and delivery infrastructure. The smart grid and demand response methods and technologies are designed to reduce consumers' peak energy demands. For example, the attempt to reduce total energy consumption used by a premise at a specific point in time by denying or limiting the consumer's user, but these technologies do not reduce total energy consumption. Moreover, these initiatives do not affect the highest contributor to energy waste in the overall system, i.e., the energy inefficiencies found in buildings and residences.

Furthermore, conventional systems, such as energy management systems, building automation systems, smart meters, home automation systems, in-premise displays, programmable communicating thermostats and DDC/Pneumatic control systems, take a singular approach to control and management, focusing only on controlling or managing the performance of the single electrical component asset or possibly the group of assets to which they are attached. These conventional systems rely on the premise occupant or premise facility manager to understand and input the correct parameters into the control systems in order to operate correctly. Further, these systems require that as conditions or premise circumstances change, these parameters be updated requiring premise occupants or premise facility managers to be extensively aware and knowledgeable of energy centric data facts such as current weather, upcoming weather, current energy pricing conditions, upcoming energy pricing conditions, other asset utilization and interactions between the current asset and the other premise assets.

SUMMARY OF THE INVENTION

Accordingly, the continued existence of energy waste and inefficiencies throughout the electric supply system and within residences and commercial buildings offer some of the greatest opportunities to the electric power industry to conserve energy, reduce carbon emissions and increase profits. The impact of these losses cascades up the energy supply chain, forcing not only increasingly higher amounts of electricity to be produced, but also requiring the deliberate over engineering of transmission and distribution grid infrastructures to meet the resultant higher peaks in energy demand. These inefficiencies result in huge, unnecessary costs in the production, distribution and consumption of electricity, as well as the unwanted creation and release of higher amounts of harmful carbon emissions.

Based on the current energy consumption landscape, it is clear that energy efficiency is the centerpiece strategy for meeting our energy and climate needs. Yet, no single program or new technology will be sufficient to solve these challenges. Meeting the demand for affordable, low-carbon energy (electricity) is a challenge with unprecedented levels of complexity. The nation's achievement of these goals can only be achieved through significant investments in energy efficiency and renewable energy supply sources.

What is needed is a holistic approach that is capable of predicting and/or dynamically adjusting operations and performance to changes in consumer behavior, market or weather conditions, grid infrastructure constraints and, stakeholder programs. Creating a clean tech, zero emissions, alternative source of energy supply source through applying technology to eliminate/minimize energy waste and improve energy efficiency offers an immediate and pragmatic, low-cost method for delivering significant, sustainable near-term relief. Delivering this relief through a highly interoperable, and smart platform placed in the premise offers a means for integrating and accelerating the adoption of critical technologies needed to ensure security of energy supply, reduce carbon emissions, eliminate waste and sustain efficiency improvements.

The energy management system and method disclosed herein provides a holistic premise energy optimization and energy efficiency reclamation system comprised of an interconnected system of software, analytics and automated process that optimizes the energy generation and storage technologies, energy consumption, energy demand and energy utilization of energy consuming assets within a premise.

Furthermore, the energy management system and method utilizes analytics and software to create a holistic intelligent software system and suite of applications that act independently and automatically to optimize the life-cycle and energy efficiency performance of premise-based energy generation and storage technologies in concert with existing and future energy consuming devices and equipment assembled and installed within the premise. Effectively, a highly interactive smart process is provided that supports and continuously adapts to the behavior and needs of the premise's occupant so as to meet and sustain required conditions of comfort and reliability while minimizing costs to the consumer, as well as, costs to the utility company through eliminating energy waste, maximizing the energy efficiency potential of the existing installed base of appliances and equipment, avoiding corresponding carbon emissions and reducing premise peak energy demand requirements

DETAILED DESCRIPTION OF THE INVENTION

The following detailed description outlines possible embodiments of the described energy management system and method for exemplary purposes. As will be described below, the system and method disclosed herein provides a fully hosted, web-based solution working automatically in a residence or business building, behind the scenes, to eliminate energy waste and optimize energy use within consumer defined rules. The system and method disclosed herein includes capabilities to learn and adapt to consumer behavior and external influences such as markets, weather, grid infrastructure constraints, regulatory mandates, and the like, in real time or otherwise, in order to sustain and continuously improve energy savings.

Figure 1:
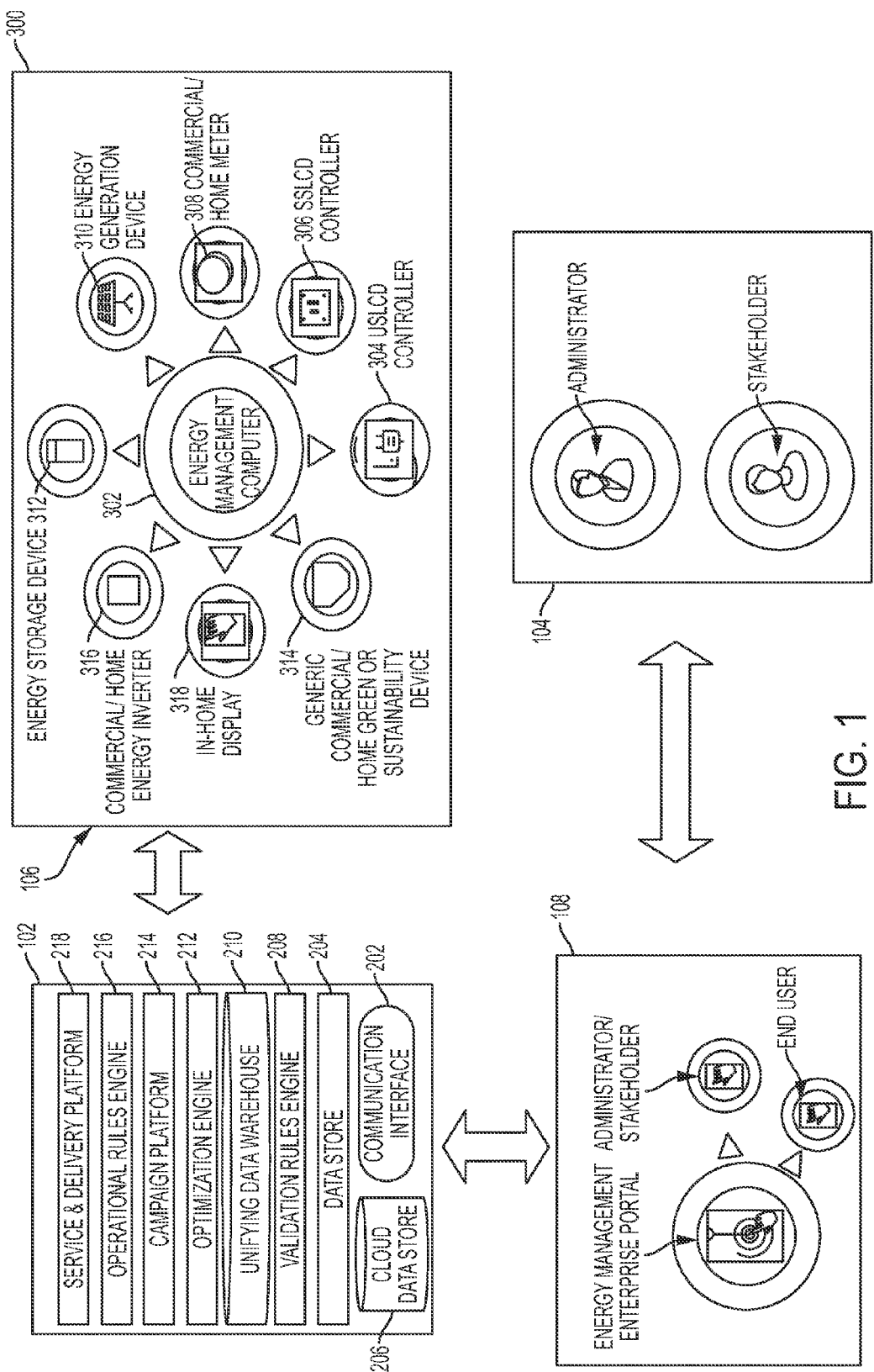
FIG. 1 illustrates block diagram of an energy management system in accordance with an exemplary embodiment.

FIG. 1 illustrates a block diagram of energy management system 100 in accordance with an exemplary embodiment. As shown, energy management system 100 creates a functional relationship between an energy management control center 102, an administrator/stakeholder 104 and an end user located at premise 106. FIG. 1 illustrates the different stratification of users that can be supported by energy management system 100. Administrator/stakeholder 104 can be a utility provider, property manager, property developer, aggregator, community/state/local agency or the like. The end user at premise 106 can be an owner/resident of the premise 106, which can be a residence/home, a commercial premise or the like.

The energy management system 100 provides an integrated array of web-enabled smart control devices, data acquisition sensors, diagnostic and performance algorithms and adaptive software installed in premise 106 and acting in concert with both centralized and distributed energy management modules provided by energy management control center 102 to deliver a user-defined choice of comfort, reliability and costs while reducing energy demand, usage and carbon emissions at premise 106.

In operation, transactional data, such as energy consumption data, acquired from sensors, devices, mobile clients and/or controllers is transmitted to energy management control center 102. As will be described in detail below, such transactional data can include the performance and use of HVAC systems, lighting, water heaters, refrigeration, major appliances, and the like. Effectively, energy management control center 102 is provided with sufficient data to learn the habits, procedures and routines of the end user(s) and the energy consuming device(s) operated at premise 106. Furthermore, energy management control center 102 is configured to actively and continuously collect data external to premise 106, such as, for example, energy markets conditions, weather conditions, grid infrastructure constraints, regulatory mandates, and the like. Using some or all of the acquired data, energy management control center 102 is configured to combine, normalize and analyze the acquired data in conjunction with data previously acquired and stored in energy management control center 102 and to generate instructions providing an optimized result for energy consumption at premise 106. Based on the optimized result, energy management control center 102 generates control instructions that are transmitted back to the sensor, device, mobile client and/or controller to dynamically adapt the premise's energy assets automatically, to thereby provide a more comfortable, reliable environment while substantially eliminating energy waste and significantly reducing energy usage. Effectively, energy management control center 102 is configured to take action automatically to eliminate energy waste and maximize the premise 106's performance. Preferably, this process is performed on a periodic base (e.g., 1 to 10 times per minute) to achieve an optimal set of results desired by the end user and/or administrator/stakeholder 104.

Moreover, energy management control center 102 offers an energy management enterprise portal 108 to provide a web-based user interface to the end user and/or administrator/stakeholder 104. Energy management control center 102 includes all hardware and software modules (not shown) that are necessary to provide a website portal (i.e., energy management enterprise portal 108) for user interaction with energy management control center 102. Specifically, energy management enterprise portal 108 is created for all interactions and configurations within energy management system 100. As such, energy management enterprise portal 108 provides the core visualization service serving as the mechanism to provide all user interface data. All business logic, analysis results and reporting are accessible from this portal 108 by both the end user(s) at premise 106 and administrator(s)/stakeholder(s) 104. Energy management control center personnel utilize this portal 108 for all daily and/or administrative functions. Specifically, energy management enterprise portal 108 enables the administrator/stakeholder 104 to view data, execute campaigns, expand the network (i.e., add users and/or add devices, etc.) as well as all other functions of the system as dictated by their secure login to the system, such as backup/restore, disaster recovery and server migration. Moreover, each end user at his or her respective premise 106 can view data and interact with energy management control center 102 (e.g., set energy consumption rules/preferences), but preferably cannot perform the administrative functions performed by administrator/stakeholder 104.

More particularly, the end user can set energy consumption rules/preferences for the desired performance of energy consuming devices at premise 106. Furthermore, the user interface provided to the end user is preferably an infinite series of tiles allowing specific interaction with campaign platform 214, which will be described in detail below. All campaigns create feedback loops from the campaign platform 214 to the end user interface and finally back to the campaign platform 214. As a result, this functionality enables real time views of items fully involved in one or more campaign. In addition this portal is the main interface for end users to log-in and set and review their premise's configuration, usage patterns and account status.

In the exemplary embodiment, energy management enterprise portal 108 creates a security checkpoint in order to validate, authenticate and authorize user transactions on energy management system 100. This sign-on portal is capable of performing all required site level actions, all required batch or group of sites operations as well as serve as the main tunnel to real time readings of the energy management system 100 as described above.

Moreover, in a further refinement of the embodiment, energy management enterprise portal 108 utilizes an interactive platform that is designed in accordance with proven social networking techniques to notify consumers of results achieved and advise consumers of further improvement opportunities that can be exercised. This platform helps keep consumers engaged in an effortless management of his/her premise 106, as well as providing a user-interface enabling a user to continuously provide critical information to utilities. In this refinement of the exemplary embodiment, the web interface provided to the end user creates a platform enabling the end user to engage in friendly competition over energy efficiency and carbon footprint reductions. Energy management control center 102 is configured to capture and report on benefits, financial and otherwise, from these energy reductions. As a result, the end user who wishes to take an active role in their energy management/consumption are provided the ability to do so.

In yet a further refinement, energy management enterprise portal 108 is configured to create a personal energy efficiency "home" page or "building" page for each end user on the Internet. This "page" is provided to marshal energy saving recommendations or observations about energy usage for the end user. Moreover, end users can connect with one another to offer for tips and knowledge transfer, and can easily connect with energy management control center personnel to assist them. Sections of energy management enterprise portal 108 are also configured to be integrated into other social networking sites (e.g., Facebook®), enabling users to proudly display their efficiency gains and carbon footprint reductions.

Figure 2:
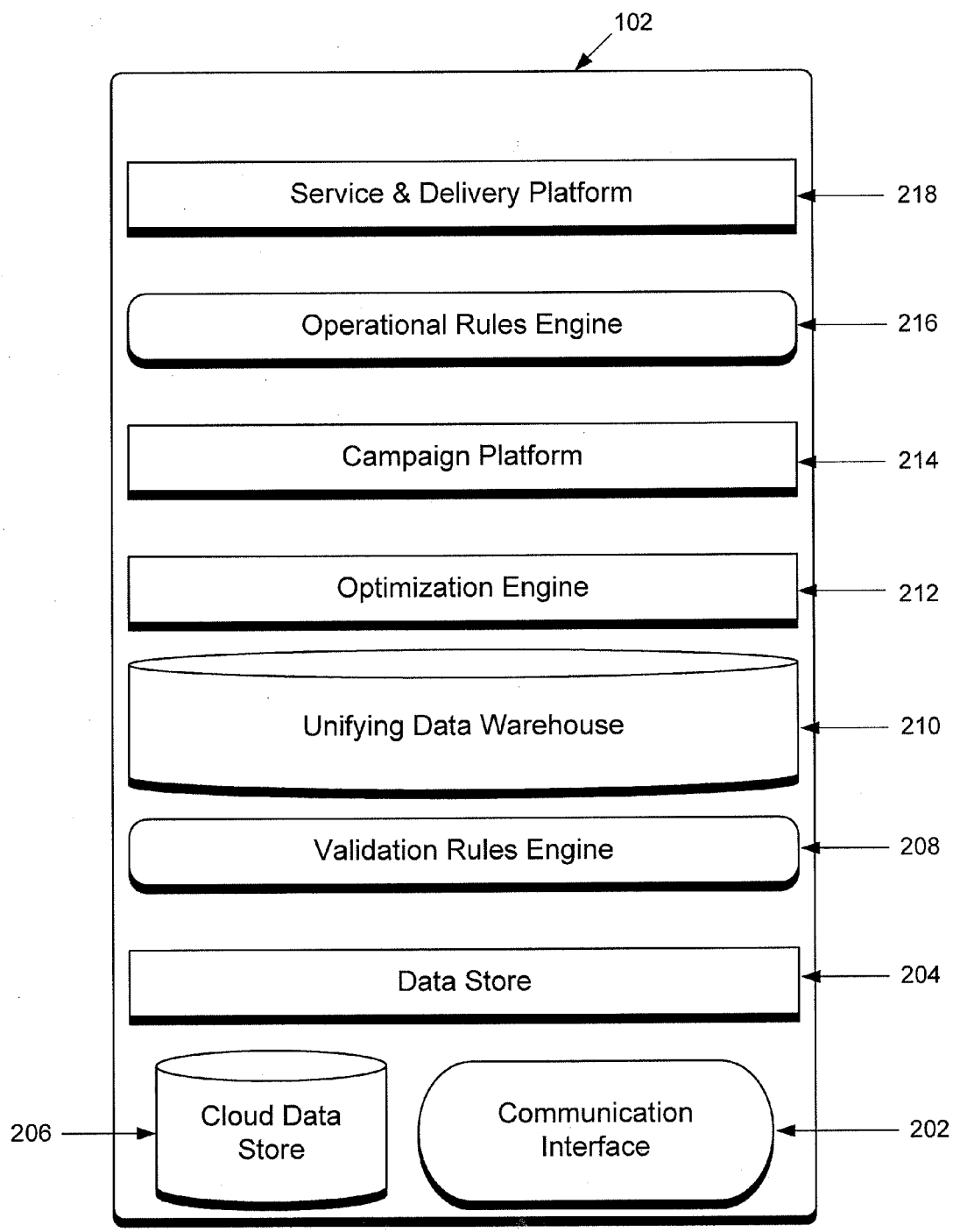
FIG. 2 illustrates a block diagram of an energy management control center in accordance with an exemplary embodiment.

FIG. 2 illustrates a detailed block diagram of energy management control center 102 in accordance with an exemplary embodiment. As will be discussed in detail below, energy management control center 102 includes hardware and software modules configured to store data acquired by each premise 106 and received by energy management control center 102. Furthermore, energy management control center 102 includes hardware and software modules enabling it to combine, normalize and analyze the acquired/stored data in conjunction with external data streams such as weather, upcoming weather, current energy pricing conditions, upcoming energy pricing conditions, other asset utilization and interactions between the current asset and the other premise assets. Accordingly, it should be appreciated that energy management control center 102 includes the necessary server(s), database(s), I/O interface(s), processor(s) and the like to enable the functionality/components discussed below. Such hardware components are known to those skilled in the art and have not been described in detail so as not to unnecessarily obscure the description of energy management control center 102 herein.

As shown, energy management control center 102 comprises a communication interface 202 configured to receive data from the sensors, devices, mobile clients and/or controllers located at each premise 106. In the exemplary embodiment, communication interface 202 can be configured to communicate with premise 106 using standard TCP/IP Internet protocols or the like. In one refinement, communication interface 202 can be implemented as an XMPP Gateway configured to receive the real time transactional data. It is noted that communication interface 202 comprises all requisite hardware and software modules (not shown) to enable communication between energy management control center 102 and remote entities, such as premise 106. These communication hardware components can include conventional I/O interfaces, such as modems, network cards, and the like. Such hardware components and software applications are known to those skilled in the art and have not been described in detail so as not to unnecessarily obscure the description of the system herein.

It should be appreciated that any conventional web service can be employed to enable data communication between energy management control center 102, administrator/stakeholder 104 and/or premise 106. As used herein, the term "web service" is provided to describe a typical application programming interface ("API") or web API that can be accessed over a network, such as the Internet, and executed on a remote system hosting the requested services. For example, in one refinement the term "web service" refers to clients and servers that communicate over the Hypertext Transfer Protocol ("HTTP") protocol used on the web. However, for purposes of this disclosure, any application enabling the exchange of information, diagnostics and control can be used for this purpose and is not limited to any particular protocol. In one refinement, the implemented web services are preferably designed to run on energy efficient blade type servers running the Linux® operating system, such that the web services can be rapidly scaled to meet the needs of a rising installation base by merely adding blades to the blade cabinets.

As further illustrated in FIG. 2, energy management control center 102 comprises data store 204 (i.e., a real time data store or operational data store or the like), which is provided to store the current value of one or more of the sensors, devices, mobile clients or controllers implemented by energy management system 100 to provide access to this data by energy management control center 102. Data store 204 is further provided to ensure current system readings before generating an optimized result to verify conditions have not changed to a state that would significantly alter the desired optimized result.

Energy management control center 102 also comprises cloud data store 206 (e.g., Cassandra cloud data store) that is configured as the primary data store of energy management control center 102. Preferably, cloud data store 206 utilizes key/value pairs to quickly store large volumes of information with extremely fast read and write time. Effectively, cloud data store 206 is provided to be able to quickly read the incoming data and store the data in a structured storage model.

Energy management control center 102 provides validation rules engine 208 which is configured to validate each data element through one or more of the following tests as would be understood by one skilled in the art: 1) static limits; 2) single value thresholds; 3) percentage of value change; 4) percentage of difference to related data objects; 5) range of standard deviation; 6) slope rate differential; 7) numeric value threshold; 8) object maturity (completeness); 9) and the like. As will be discussed below, once the received transactional data has passed this validation step, it is used for decision making processes to generate the optimized result(s).

Energy management control center 102 also comprises unifying data warehouse 210 which is configured as the transactional data store of energy management system 100 storing all historical records of incoming data, current system components and executed optimized results. More particularly, unifying data warehouse 210 is configured to store customer preferences, historical energy usage and equipment performance data, manufacturer equipment specifications, market rules, utility rates, weather data, and the like. Unifying data warehouse 210 is configured to support the analysis, optimization and data mining for continuous energy efficiency improvements provided by energy management system 100. Effectively, unifying data warehouse 210 serves as a central repository of energy management control center 102's electronically stored data. Further, it should be understood that unifying data warehouse 210 can be managed by any applicable software. For example, in the exemplary embodiment, unifying data warehouse 210 is authored with generic SQL, and can run on Microsoft SQL Server®, MySQL® or Oracle®.

Energy management control center 102 also comprises optimization engine 212 which is configured to perform the required data calculations for energy management system 100. As will be discussed in detail below, optimization engine 212 is configured to retrieve and analyze the data stored in unifying data warehouse 210 and to create new data points as it calculates per the requirements of each individual implementation. Preferably, these calculations are infinitely nested providing infinite ability to create new calculated data points.

Energy management control center 102 also comprises campaign platform 214 as mentioned above. Once all data has been received and stored in energy management control center 102 via communication interface 202, data store 204, cloud data store 206, validation rules engine 208, unifying data warehouse 210, and optimization engine 212, energy management system 100 can be considered to have both the existing state of all sensors, devices, mobile clients or controllers at each premise 106 as well as the user rules/preferences of the administrators/stakeholders 104 and end user(s) at premise 106. Accordingly, campaign platform 214 is configured to enable the respective users to executed pre-compiled routines that represent all the bundled business rules of standard and enhanced energy management. These campaign types include both traditional methods of demand reduction such as demand response as well as more advanced and emerging methods of energy management such as energy optimization. Since campaigns are defined as collections of business rules for operational rules engine 216, new campaign types as well as new campaigns can be defined on a real-time bases the respective users via portal 108. These campaigns preferably serve as executed energy management improvements for energy measurement and verification, meaning that each campaign becomes a measured unit of energy demand or energy consumption reduction with the total energy reduction at any single premise being equal to the sum of energy reductions from all involved campaigns.

As mentioned above, energy management control center 102 includes operational rules engine 216, which is configured to execute further validation by linking to validation rules engine 208. For example, operational rules engine 216 provides "IF Then Else" logic for all connected sensors, devices, mobile clients or controllers of each premise 106. As a result, operational rules engine 216 reads nodes from unifying data warehouse 210 and executes business rules, defined by respective users, across separate sensors, devices, mobile clients or controllers.

Finally, energy management control center 102 comprises service and delivery platform 218, which is configured to push the overall optimized result to any other connected node (i.e., the sensor, device, mobile client or controller of the respective premise 106). It should be understood that service and delivery platform 218 functions in conjunction with communication interface 202, which is further configured to transmit the optimized results to premise 106 using standard TCP/IP Internet protocols or the like.

Figure 3:
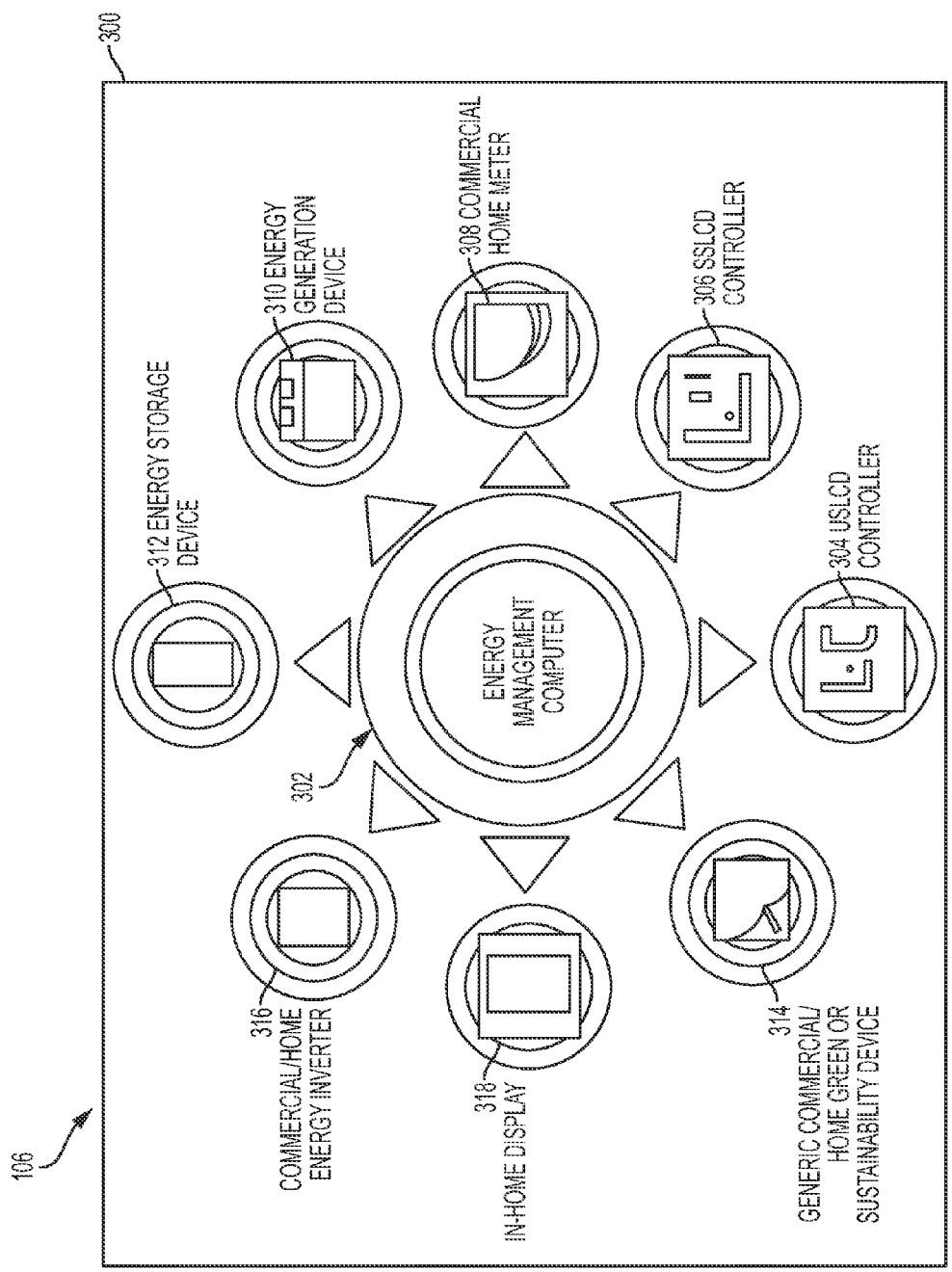
FIG. 3 illustrates premise automation network in accordance with an exemplary embodiment.

FIG. 3 illustrates premise automation network 300 in accordance with an exemplary embodiment. As discussed above, premise 106 is configured to communicate with energy management control center 102. As illustrated in FIG. 3, premise automation network 300 can be installed at premise 106. In particular, premise automation network 300 comprises energy management computer 302 and a plurality of sensors, devices, mobile clients and/or controllers 304-316, which will be discussed in detail below. Premise automation network 300 is designed to gain effectiveness from allowing technology to automatically perform tasks that end users traditionally perform manually. Advantageously, premise automation network 300 is user-friendly in that it does require the user to change any current pattern or practice.

During installation, premise automation network 300 is preferably implemented over premise 106's existing electric power line wiring such that energy management computer 302 can communicate with the plurality of sensors, devices, mobile clients and/or controllers 304-316 over the existing electrical infrastructure. Conventional power line communication or power line carrier ("PLC") technology is a known, reliable network technology infrastructure application deployed both in commercial and residential applications for carrying data on a conductor that is also used for electric power transmission. It is noted that while only seven types of sensors, devices, mobile clients and/or controllers are illustrated in FIG. 3, it will be readily apparent from the detailed description herein that the specific number of components is not limited in a given premise.

Utilizing PLC technology, energy management computer 302 is configured to employ the existing electrical infrastructure in a premise 106 to receive the transactional data measured by the plurality of sensors, devices, mobile clients and/or controllers 304-316. To implement PLC technology in the exemplary embodiment, the network protocols used within premise automation network 300 are preferably the standardized protocols by the International Organization for Standardization ("ISO") under the following articles:

ISO/IEC 14908-1: Open Data Communication in Building Automation, Controls and Building Management—Control Network Protocol—Part 1: Protocol Stack.

ISO/IEC 14908-2: Open Data Communication in Building Automation, Controls and Building Management—Control Network Protocol—Part 2: Twisted Pair Communication.

ISO/IEC 14908-3: Open Data Communication in Building Automation, Controls and Building Management—Control Network Protocol—Part 3: Power Line Channel Specification.

ISO/IEC 14908-4: Open Data Communication in Building Automation, Controls and Building Management—Control Network Protocol—Part 4: IP Communication.

In an alternative embodiment, energy management computer 302 is configured to communicate wirelessly with the plurality of sensors, devices, mobile clients and/or controllers 304-316 using a wireless communication protocol such as a ZigBee® wireless communication protocol available from Echelon®, Cisco® or the like. It should therefore be appreciated that energy management computer 302 can implement any existing protocol stack that enables energy management computer 302 to communicate with any secondary network protocol implemented by premise automation network 300.

Figure 4:
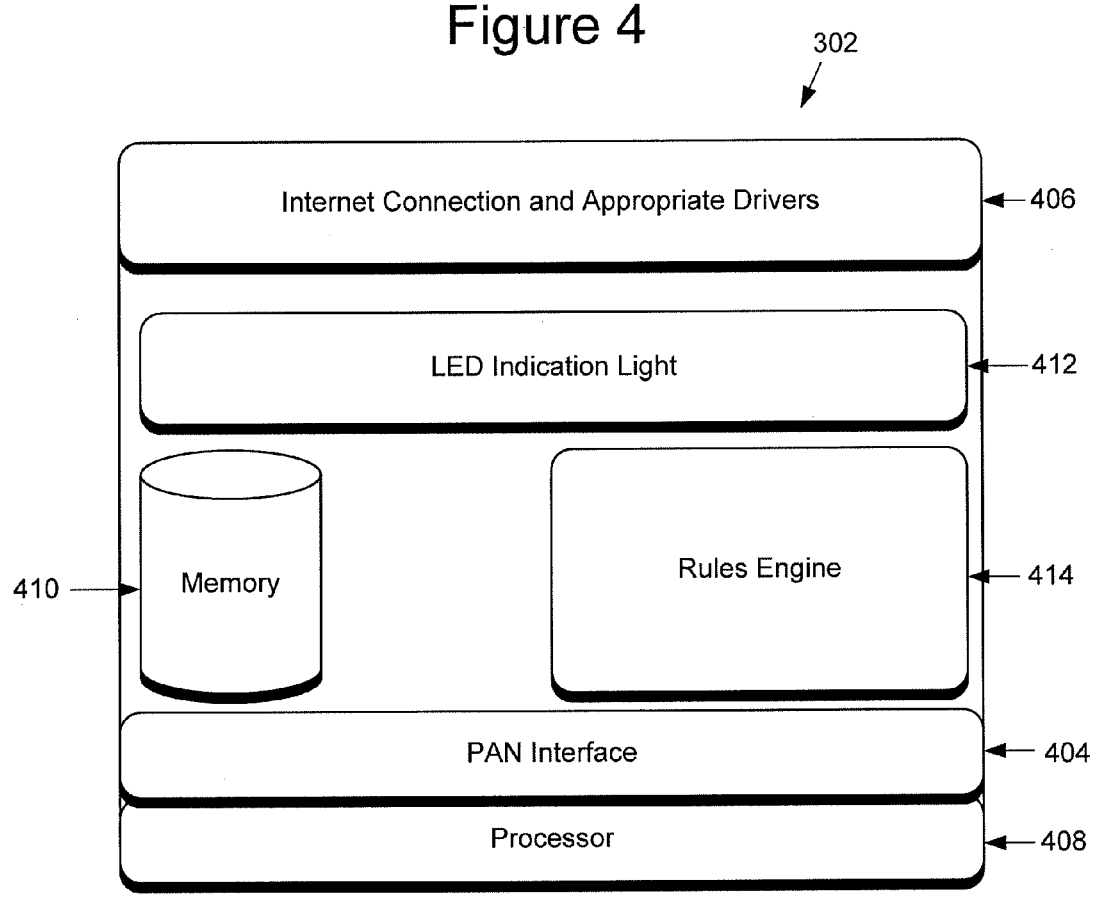
FIG. 4 illustrates a block diagram of a energy management computer in accordance with an exemplary embodiment.

FIG. 4 illustrates a detailed block diagram of the energy management computer 302 in accordance with an exemplary embodiment. As noted above, energy management computer 302 serves as a supervisory and gateway device for each respective premise automation network 300 of the particular premise 106 in which it is installed.

In the preferred embodiment, energy management computer 302 is a single board computer including all of the required hardware and software components needed to perform the functions for energy management system 100. However, it is noted that the functionality of energy management computer 302 can be implemented in software. Under a software implementation, energy management software can be installed on a conventional host system, for example, any type of laptop, desktop, microprocessor or the like that can be configured to perform these functions. It should be appreciated that any such host system should include an active internet connection as well as a connection to premise automation network 300 (i.e., PLC network or ZigBee® wireless network or the like). Advantageously, this configuration would enable existing home technology such as home computers, set-top boxes and wireless routers/networking equipment and the like to serve as energy management computer 302 within premise automation network 300.

Energy management computer 302 comprises premise automation network interface 404, internet connection 406, processor 408, memory 410 and an LED indication light 412. Premise automation network interface 404 is configured to communicate with the plurality of sensors, devices, mobile clients and/or controllers 304-316, using PLC communication protocols, wireless communication protocols, or the like as discussed above. If energy management computer 302 is configured to communicate using PLC communication protocols, it is noted that, in this embodiment, energy management computer 302 includes a power transformer (not shown) for power line communication and energy management computer 302 is configured to be plugged directly into an existing electrical outlet of the premise 106. It is further noted that if energy management computer 302 is configured to communicate wirelessly with the plurality of sensors, devices, mobile clients and/or controllers in premise automation network 300, energy management computer 302 is equipped with the necessary expansion slots (not shown) such that wireless cards and the like can be utilized for wireless communication in conjunction with premise automation network interface 404. For example, energy management computer 302 can be configured to communicate through ZigBee® wireless protocols in which a low-speed ad-hoc network of nodes (i.e., energy management computer 302 and the plurality of sensors, devices, mobile clients and/or controllers 304-316) is constructed upon installation and automatically updated when the plurality of sensors, devices, mobile clients and/or controllers 304-316 are added and removed from premise automation network 300.

Furthermore, internet connection 406 is configured to communicate with external networks preferably using standard TCP/IP Internet protocols or the like. For example, in one embodiment, internet connection 406 can be a standard Ethernet connection. It should be appreciated, however, that internet connection 406 can be any wireless connection interface, DSL interface, cable modem, cellular connection, CDMA interface, GSM interface, or the like.

Utilizing internet connection 406, energy management computer 302 is configured to connect to and enable communication with communication interface 202 of energy management control center 102. Effectively, energy management system 100 provides the free exchange of transactional data via the Internet communication standard between energy management control center 102 and premise 106. Accordingly, as will be discussed in detail below, energy management computer 302 can transmit acquired data to energy management control center 102, and, in turn, receive instructions in the form of optimized results generated and transmitted by energy management control center 102 via standard TCP/IP Internet protocols.

Processor 408 is configured to execute all of the application functions of energy management computer 302 including to process the received instructions via a localized rules engine 414 and translate them to the native PLC/wireless communication protocol to implement the desired routines in a runtime production environment. It should be understood that once connected to energy management control center 102, energy management computer 302 effectively becomes an active node within energy management system 100. It is further envisioned that at least one energy management computer 302 is installed at a respective residence or business building, and that many separate premises each installed with an energy management computer 302 create many respective active nodes within energy management system 100. Furthermore, processor 408 is configured to operate energy management computer 302 using any applicable operating software such as Linux® or the like. In the exemplary embodiment, the programming and configuration of energy management computer 302 can be done using the Java® programming language and installed remotely from energy management control center 102. Energy management computer 302 is configured to accept a series of modules, each providing a different purpose or process which it monitors in premise 106. It should be appreciated that technology refreshment can be performed dynamically and remotely through software upgrades, allowing system life to be readily and economically extended.

As will also be explained in detail below, in operation, energy management computer 302 is configured to acquire data from the plurality of sensors, devices, mobile clients and/or controllers 304-316 via premise automation network 300. Preferably, each system component communicates in a "push" manner to premise automation network interface 404 of energy management computer 302 on any change of value and/or on a periodic basis. Memory 410 is configured to temporarily store this data until it is transmitted to energy management control center 102. In the exemplary embodiment, memory 410 is non-volatile flash memory and the database is built on the MySQL® open source database platform. However, any type of memory capable of performing such storage functions can be used by energy management computer 302. In addition, memory 410 is configured to store data files backing up the current configurations for all components of premise automation network 300. Moreover, LED indication light 412 is provided to alert the home or business end user to its status.

Referring back to FIG. 3 and as discussed above, energy management computer 302 is configured to communicate with the plurality of sensors, devices, mobile clients and/or controllers 304-316 via standard PLC technology using the existing electrical wiring infrastructure of the premise 106 where it is installed or via wireless communication protocols. As shown, energy management computer 302 is communicatively coupled to one or more energy consumption controllers, which can include "universal sensory and load control device" ("USLCD controllers") 304 and "specialized sensor & load control device" ("SSLCD controllers") 306.

USLCD controllers 304 is configured to be plugged into an existing wall outlet and can communicate with energy management computer 302 using the existing electrical wiring infrastructure. For example, USLCD controller 304 can be implemented with a single, double, triple, or quadruple plug or power strip, enabled to function in premise automation network 300. Alternatively, USLCD controller 304 is provided with conventional wireless communication components to communicate with energy management computer 302 accordingly. As a result, USLCD controllers 304 are configured to enable energy management computer 302 to control any electrical devices attached to the wall outlet by sending control instruction signals to the USLCD controller 304.

In an alternative embodiment, USLCD controller 304 can be configured with the software implementation of energy management computer 302. As a result, USLCD controller 304 can be configured to communicate directly with communication interface 202 of energy management control center 102.

In general, there are three types of operations that can be performed by USLCD controllers 304 and SSLCD controller 306 in response to the control instruction signals received from energy management computer 302. These instructions are: (1) Remove the Load; (2) Redirect the Load; and (3) Reduce/Increase the Load. Examples of these control operations are as follow:

(1) Remove the load. Remove the Load is an instruction to completely switch off the controller corresponding to a particular load (e.g., an appliance connected to a controller) such that it is in a "Zero Draw" mode. Loads that have been deemed appropriate for the Remove the Load instruction are switched to "Zero Draw" mode designated to be without the modification of another load. Remove the Load is the most effective strategy for energy reduction. Turning an HVAC Unit "OFF" since it will not be needed for the remainder of an occupied cycle is an example of a Remove the Load instruction.

(2) Redirect the Load. Redirect the Load is an instruction in which certain controllers corresponding to particular loads are switched off to be in "Zero Draw" mode, but in conjunction with the Redirect the Load instruction, another load has been or will be utilized more. In this sense the Redirect the Load instruction simply "Redirects" the energy consumption from one load to another load. The goal of this strategy is for the load receiving the redirect to be more efficient or consume less overall power than the load being the redirected. Turning an HVAC unit "OFF" and a ceiling fan "ON" is an example of redirecting a load from the HVAC, which consumes a significant amount of energy, to the ceiling fan, which consumes substantially less energy than the HVAC.

(3) Reducing/Increasing the Load. Reducing/Increasing the Load is an instruction in which certain loads have their main process variable reduced/increased in such a manner to either reduce or increase the amount of work as deemed appropriate by the energy management control center 102. For example, the amount of energy consumed turning an HVAC unit's set point from 75 degrees to 72 degrees is an example of reducing the process variable of a electric radiator to conserve energy.

Figure 5:
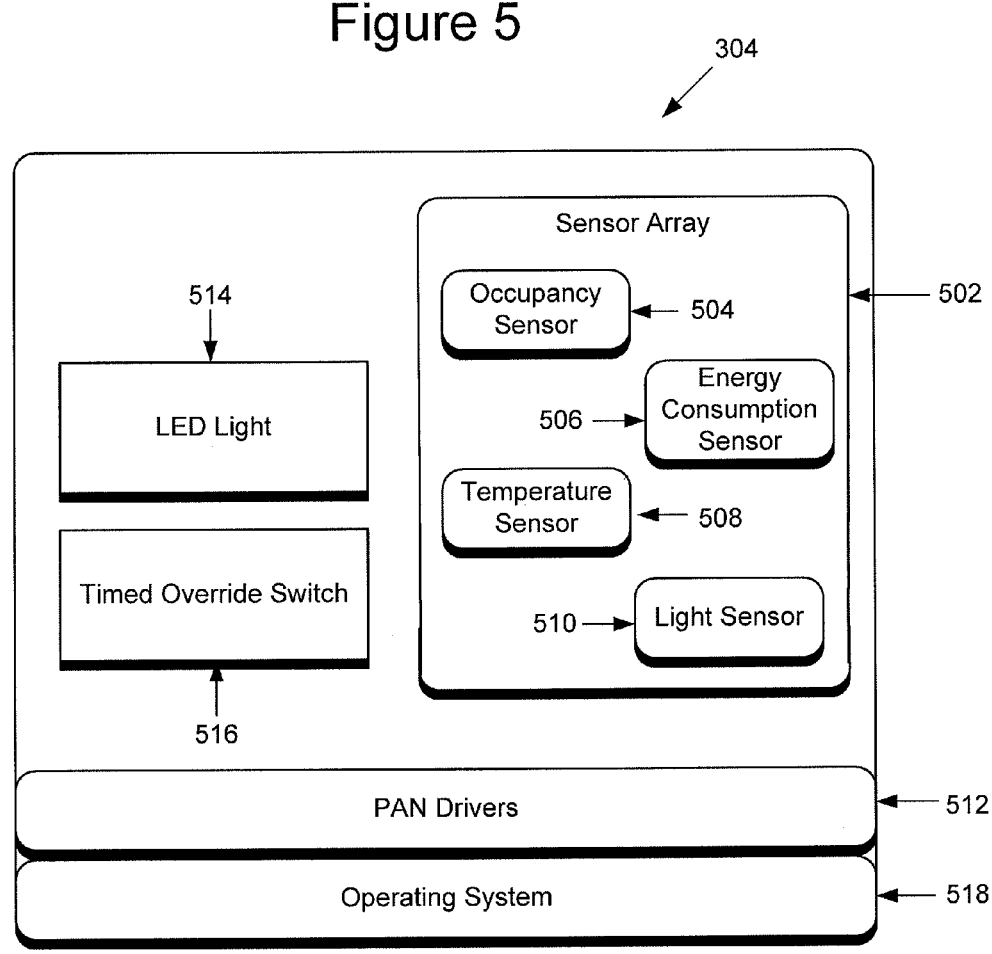
FIG. 5 illustrates a block diagram of a sensor/controller in accordance with an exemplary embodiment.

FIG. 5 illustrates a detailed block diagram of an exemplary embodiment of USLCD controller 304 in accordance with an exemplary embodiment. As shown, USLCD controller 304 preferably includes multiple sensors in sensor array 502, which are each configured to determine various data both about the operations of the associated energy consuming device/appliance as well as more general information about the premise 106 and/or specific room in which the device is located. The sensors include, but are not limited to, occupancy sensor 504, energy consumption sensors 506, temperature sensor 508, light sensor 510, and the like. These sensors capture the data elements acquired from premise 106 and, by using the basic information acquired by these sensors, many types of information about the room or area in which the particular USLCD controller 304 is located can be determined. For example, energy consumption sensors 506 is configured to measure the current drawn from the appliance/device connected to the particular USLCD controller 304. In this regard, energy consumption sensors 506 can measure the current consumed by the appliance/device and provide an accurate reading to energy management computer 302. It is noted that occupancy sensor 504, energy consumption sensors 506, temperature sensor 508, and light sensor 510 each include the appropriate hardware to measure the respective data as would be appreciated by those skilled in the art. For example, energy consumption sensors 506 can include an ammeter, voltmeter, multimeter or similar appropriate measuring device configured to measure the current drawn by the appliance/device coupled to the energy consumption sensors 506 USLCD controller 304.

USLCD controllers 304 are further configured to transmit the captured data about a room or area to energy management computer 302 utilizing premise automation network drivers 512. As discussed above, once received by energy management computer 302, the data is combined with data from the plurality of sensors, devices, mobile clients and/or controllers 304-316 within premise 106 ultimately enabling energy management system 100 to determine a wide view of activities occurring in the residence or business building and the particular rooms therein. In an additional refinement, each USLCD controller 304 provides an LED light 514 to alert the home or business end user to its status and a timed override switch 516 enabling the end user to bypass the existing program for a preset or indefinite period of time. Moreover, USLCD controller 304 comprises the requisite hardware (not shown) required to perform the functions of (1) Remove the Load; (2) Redirect the Load; and (3) Reduce/Increase the Load. The requisite hardware can include electrical/electromechanical switches, variable resistors, and the like as would be readily apparent to one skilled in the art.

In one embodiment, USLCD controller 304 can further be provided as a USLCD light switch controller or similar such controller. Effectively, a plurality of USLCD controllers 304 can be positioned throughout premise 106 at wall outlets, light switches, and other applicable locations. Employing the internal sensors of sensor array 502, the plurality of USLCD controllers 304 are preferably designed to take the place of the sensing end of the preexisting thermostat at the premise 106, and, as noted above, are configured to forward temperature readings and/or light switch data to energy management computer 302. As such, the plurality of USLCD controllers 304 provide a combination and correlation of the temperature readings and light switch data that enables energy management computer 302 to determine the rate of use for each HVAC unit installed in the premise 106. Moreover, this configuration allows for dynamic and programmatic utilization of HVAC assets for not only normal daily operation but also in critical energy events like demand response programs.

In the exemplary embodiment, premise automation network 300 employs 220 volt as well as a 110 volt USLCD outlets controllers such that energy consuming equipment in premise 106 can be added to energy management computer 302's control quickly and easily. This allows for dynamic and programmatic utilization of other home and business building assets for not only normal daily operation but also for critical energy events like demand response programs. For example, a simple demand response application of this functionality might be to schedule and run dishwashers, washers, dryers, and the like, in the middle of the night when energy is plentiful instead of during peak day periods. Moreover, as the capabilities of such appliances further develop, if the end user decides the clothes dryer needs to be run during the day, then energy management computer 302 can preferably switch off the heating element of the clothes dryer, but continue to tumble clothes, when energy prices are at a premium, and then switch the heating element back on when demand eases.

In a further refinement of this embodiment, USLCD controller 304 is configured to utilize an interoperable self-installation protocol in which the device is automatically configured when added to premise automation network 300. In this embodiment, when an end user adds a device to premise automation network 300 by plugging it into an outlet equipped with a USLCD controller 304, premise automation network 300 installs the necessary configuration in energy management computer 302 needed for operation. It should be appreciated that each USLCD controller 304 can employ an operation system 518, including the requisite hardware (e.g., processor and memory (not shown)) as would be appreciated by those skilled in the art, to control the functionality of USLCD controller 304. For example, as noted above, USLCD controller 304 can be configured with the software implementation of energy management computer 302. In this embodiment, operating system 518 is provided with a processor and memory to execute the software implementation accordingly.

Referring back to FIG. 3, energy management computer 302 is also configured to be communicatively coupled to "specialized sensor & load control device" controllers ("SSLCD controllers") 306 within premise automation network 300. Generally, each SSLCD controller 306 employs the same core components as USLCD controller 304 as illustrated in FIG. 5, and is manufactured with similar internal components, with the exception of the external body and wiring interfaces. In the exemplary embodiment, each SSLCD controller 306 can be designed with a single application in mind and make special provisions for specific application functionality. As such, each respective SSLCD controller 306 is configured to interface with an end user's particular energy consuming device that is wired directly into the premise 106's electrical system instead of being plugged into electrical outlets. For example, SSLCD controller 306 is configured to interface with devices that allow for three wire direct connects, such as those used in modern electric ovens and HVAC systems. For instance, SSLCD controller 306 is designed to be affixed between the existing home or business building thermostat and the HVAC unit's terminal block. It is designed with clip-on terminal block connectors for installation. In general, premise HVAC systems utilize a standard wiring design that is regulated by the International Standards Organization, so terminal block wiring from home to home is nearly identical. SSLCD controller 306 is preferably designed for HVAC applications and works by mimicking a thermostat of the premise HVAC unit. Utilizing this method, SSLCD controller 306 is capable of easily integrating to almost any premise HVAC system.

In the exemplary embodiment, SSLCD controller 306 is configured to communicate with energy management computer 302 using either PLC or wireless communication protocols and generally requires control instruction signals from energy management computer 302 to operate and control the associated appliance/energy consuming device. As such, the core technology for SSLCD controllers 306 lies within the Java based HVAC module in energy management computer 302. In an alternative embodiment, SSLCD controller 306 is configured with the software implementation of energy management computer 302. As a result, SSLCD controller 306 can be configured to communicate directly with communication interface 202 of energy management control center 102.

Moreover, similar to USLCD controllers 304, SSLCD controller 306 is also configured to utilize an interoperable self-installation protocol in which a device is automatically configured when added to premise automation network 300. In this embodiment, when an end user wires a device directly into the premise 106's electrical system, premise automation network 300 installs the necessary configuration in energy management computer 302 needed for operation.

As noted above, SSLCD controllers 306 are designed to be located between the thermostat and the wires leading to the HVAC unit's terminal block. While SSLCD controllers 306 can therefore be used to control the operation of the HVAC unit, SSLCD controllers 306 are further configured, upon failure, to receive control instruction signals and/or signals from the HVAC unit, to disable itself and effectively allow the HVAC unit to resume its standard mode of operation. It should be further appreciated that under this design arrangement, should an electrical or network failure occur, the pre-existing thermostat can retake control.

Finally, employing SSLCD controllers 306 as HVAC controllers provides a component that can accurately measure the exact energy consumption expenses being saved by the end consumer. This is because the energy management computer 302 is further configured to record and measure what the preexisting thermostat in premise 106 would have instructed the HVAC units to do versus what energy management computer 302 is instructing the HVAC units to do for delivery of the desired temperature and HVAC control.

In conjunction with USLCD controller 304 and SSLCD controller 306, premise automation network 300 comprises additional components configured to communicate with energy management computer 302 using either PLC, wireless communication protocols or the like. Specifically, premise automation network 300 further comprises commercial/home meter 308 (e.g., A.M.I., A.M.R., electromechanical or the like); energy generation device 310 (e.g., solar, wind or the like); energy storage device 312 (e.g., battery or the like); generic commercial/home green or sustainability device 314; and commercial/home energy inverter device 316. Each of these devices is provided in accordance with their conventional hardware and functionality. Moreover, each of these devices can include those components of USLCD controller 304 and/or SSLCD controller 306 as described above with respect to FIG. 5. In a further refinement, any one of devices 304-316 can be configured with a software implementation of energy management computer 302. As a result, such components can operate as a host and can be configured to communicate directly with communication interface 202 of energy management control center 102. Finally, as shown in FIG. 3, in-home display 318 may be provided at premise 106 so as to enable the end user to have an alternate route for the input of consumption rules, preferences and the like through a touch-screen interface in addition to the energy management enterprise portal 108.

Figure 6:
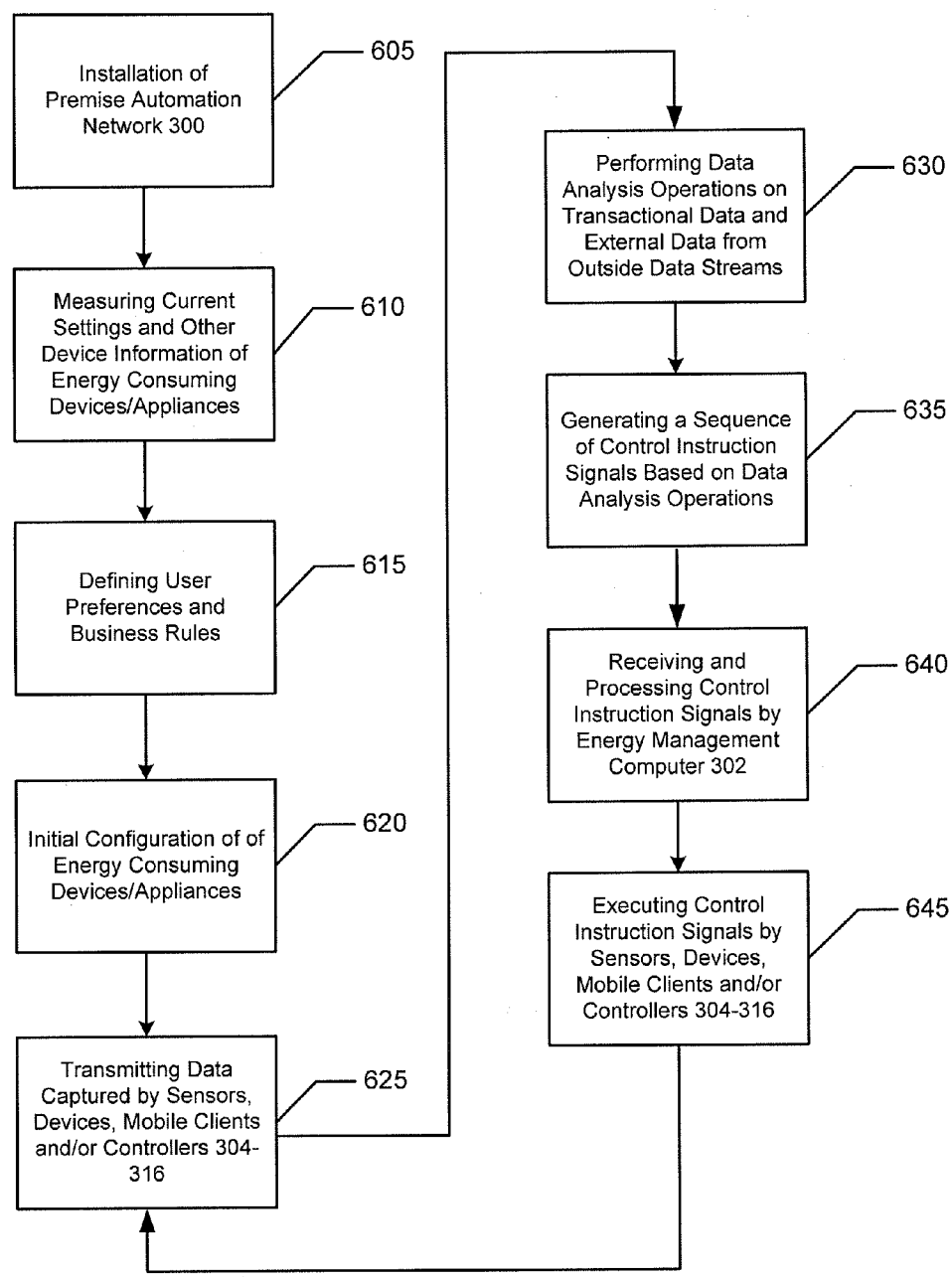
FIG. 6 illustrates a flowchart for a method for managing energy consumption in accordance with an exemplary embodiment.

FIG. 6 illustrates a flowchart for a method for managing energy consumption in accordance with an exemplary embodiment. As shown, initially at Step 605, a premise automation network 300 is installed at an end user's premise 106. Next, at Step 610, the current thermostat settings, the temperatures in the freezer(s) and refrigerator(s) and any other variable setting devices are measured either by the applicable sensors and/or controllers or a technician completing the installation process. On/off devices, such as TVs, lights, pool and spa pumps, radios, computers, washers and dryers, and any other such energy consuming devices need not be measured in any way, but their make, model and serial numbers are provided to the energy management control center 102 for storage in unifying data warehouse 210. This data is then analyzed to define a user profile and create a digital model of each home, including the type and location of each energy consuming device/appliance.

At Step 615, the end user's preferences and requirements selections, such as work schedules, climate environment, essential equipment that must be run all the time (e.g., medical equipment), cost preferences and the like are recorded. In the exemplary embodiment, this information can be entered directly by a user via the user-interface in response to a standard set of questions and responses. These data and user preferences are then provided to energy management control center 102 to be stored in unifying data warehouse 210. At this point, premise automation network 300 of the given premise 106 is ready for operation.

At Step 620, the electronic appliances and other energy consuming devices are initially configured in accordance with the user's initially defined preferences. To perform the initial configuration, the energy management control center 102 can generate control instruction signals that are transmitted to energy management computer 302 of the end user's premise 106. These control instruction signals are in turn, processed and transmitted to the plurality of sensors, devices, mobile clients and/or controllers 304-316. As discussed above, USLCD controllers 304, SSLCD controllers 306 and the like are configured to control the operation of the associated appliances/energy consuming devices implementing instructions including (1) Remove the Load; (2) Redirect the Load; and (3) Reduce/Increase the Load.

In one example, based on the end user's work schedule, control instruction signals are generated for the HVAC system such that energy management computer 302 "Reduces the Load" when the end user leaves for work and "Increases the Load" providing the end user's specified temperature to be reached in premise 106 when the end user arrives home from work. More particularly, an end user may define three different profiles for his or her premise 106: (1) "Home," (2) "Work," and (3) "Night Time." The "Home" profile contains all the settings for when the end user is in the home. The "Work" profile contains all the settings for when the end user is at work. Finally, the "Night Time" profile contains all the settings for when the end user is asleep. Utilizing the user-interface provided by energy management enterprise portal 108, the end user can set these preferences, which can, in turn, be automatically scheduled by energy management control center 102. This allows the entire home or business facility to be automatically aware of changes to these schedules and adapt to them without any further effort taken by the end user.

Once the premise automation network 300 has been established and all appliances, consumer electronics, and any other applicable equipment have been configured for initial operation, the end user's premise 106 is in a position to begin normal operation in accordance with energy management system 100. Specifically, at Step 625, the premise automation network 300 performs a series of steps capturing data available to the plurality of sensors, devices, mobile clients and/or controllers 304-316. More particularly, sensors within sensor array 502 of the plurality of sensors, devices, mobile clients and/or controllers 304-316, and in particular USLCD controllers 304 and SSLCD controllers 306, collect data such as energy consumption, temperature, light, active ultrasonic occupancy data and the like. As noted above, this transactional data is then transmitted to the energy management computer 302 via PLC or wireless technology, where it is then stored in memory 410 before being transmitted to the energy management control center 102.

Next, after the transactional data is transmitted to the energy management control center 102, the energy management control center 102 utilizes analytics and software to perform data analysis operations (Step 630) on the data further taking into account external data unrelated to the transactional data as well as user defined rules and preferences.

As will be explained in detail below with respect to FIG. 7, based on the configuration setting selected by the end user during the installation process, energy management computer 302 can modify the configurations of the appliances/energy consuming devices in order to achieve the maximum energy efficiency. In addition, energy management system 100 performs calculations, modeling and algorithmic analyses resulting in inferred and predictive end user information. More particularly, energy management system 100 includes adaptive software and techniques capable of learning and dynamically optimizing energy use within the end user's premise 106 to match to the changing patterns of the end user's behavior. For example, appliances, other energy consuming devices and consumer energy behavior are correlated together on a whole house or system level employing data mining techniques within unifying data warehouse 210. As such, energy management control center 102 is configured to determine what actions are to be taken to optimize energy use on the basis of observing the dependencies over time between consumer behavior and the operating condition of controllers, sensors, equipment and appliances. The historical importance of these relationships to one another is applied to optimize performance.

Furthermore, energy management control center 102 is configured to observe and use in its optimization techniques the correlated relationship between external and internal factors such as the performance of internal HVAC systems in response to approaching changes in weather conditions and temperature. Energy management control center 102 is then configured to employ these observations to predicatively optimize HVAC operations. For example, if a cool weather front is approaching the geographical location of the given premise 106, energy management control center 102 applies this data to the current operational settings of the associated HVAC unit and generates a control instruction signal, such as a Decrease the Load instruction, to reduce the load being applied to the air conditioning unit while further taking into account the end user's temperature preferences.

Energy management control center 102 is further configured to analyze the electric signature of equipment and appliances such as HVAC systems, water heaters, refrigerators, or the like, enabling the identification of conditions denoting incipient performance degradation or failure. This analysis provides the means for proactive measures to be taken in resolving the underlying circumstances to increase reliability and reduce asset life cycle costs. As such, energy management control center 102 in conjunction with energy management computer 302 continuously assesses the performance of premise HVAC systems (cooling, heating, air flow, etc.), lighting, water heaters, refrigeration, major appliances and other equipment and is configured to automatically "tune" these major energy consuming devices optimizing their energy efficiency performance to save energy.

In a further refinement of this step, if the transactional data is indicative of significant changes from historical norms, energy management control center 102 includes analytics and software to recognize these changes so as to automatically flag these behaviors for investigation and adjustment of schedules or other stated performance conditions. For example, energy management control center 102 is configured to create "pre-assembled event response initiatives" that, in response to certain data stimuli, work to automatically control energy management system 100 to act in an integrated fashion to deliver specific results or outcomes defined by rules stored in unifying data warehouse 210 of energy management control center 102.

At Step 635, the energy management control center 102 generates a sequence of controlling instruction signals in response to the data analysis operations, and transmits these instructions to the energy management computer 302 of the premise automation network 300. At Step 640, the energy management computer 302 receives and translates these signals such that the energy management computer 302 can drive the plurality of sensors, devices, mobile clients and/or controllers 304-316, and preferably USLCD controllers 304 and SSLCD controllers 306, resulting in an optimization of energy consumption, peak energy demand, reduction of carbon emissions, reliability, comfort and costs while meeting consumer preferences. To implement these goals, the energy management computer translates the controlling instructions signals to control commands (i.e., "Remove the Load," "Redirect the Load," and "Reduce/Increase the Load") to be sent to the applicable USLCD controllers 304 and SSLCD controllers 306, which in turn, performs the designated functions (Step 645).

Finally, it should be understood that Steps 625 through 645 can be repeated on a periodic basis (e.g., every 60 seconds) to periodically "tune" the appliances/energy consuming devices to maximize energy consumption efficiency. Through this repeating cycle, the analytics and software implemented at the energy management control center 102 can continuously integrate and synchronize the methods, procedures, premise-based assets, equipment, consumer rules, behavior, portals, communication networks, intelligent processor, sensors, controllers and services required to deliver the results in energy consumption, carbon emissions and peak demand reductions, improved consumer comfort, convenience and reliability, reduced utility and consumer costs and, the extended life cycle of premise-based assets.

Figure 7:
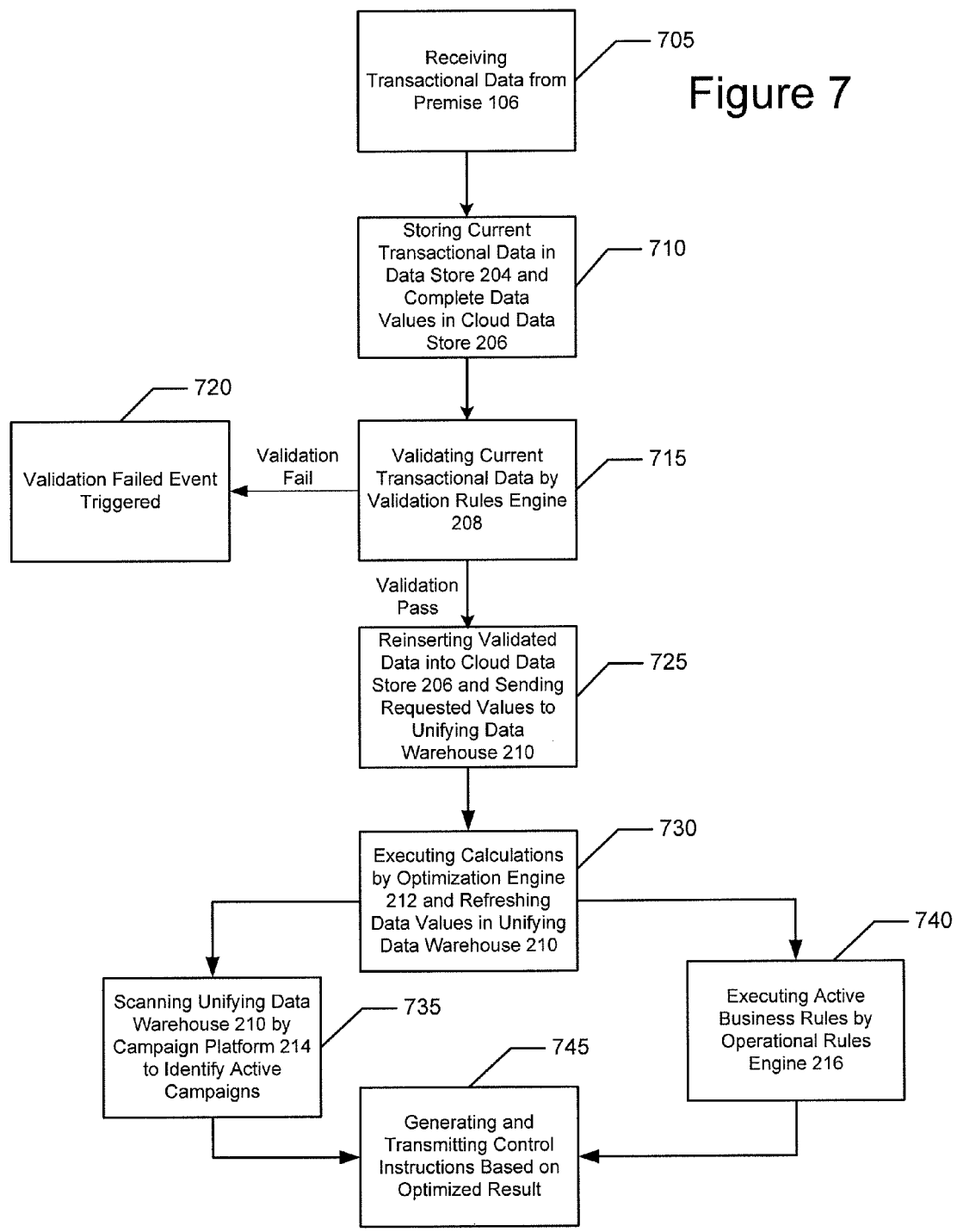
FIG. 7 illustrates a flowchart of an exemplary data analysis in accordance with an exemplary embodiment.

FIG. 7 illustrates a flowchart of an exemplary data analysis performed by energy management control center 102 in accordance with an exemplary embodiment. It should be appreciated that the flowchart illustrated in FIG. 7 corresponds with the data analysis step (Step 630) described above with respect to FIG. 6.

Initially, at Step 705, real-time transactional data is received from energy management computer 302 of premise 106 via connection interface 202. Next, at Step 710, the transactional data is then stored by data store 204, which only stores the current value of the transactional data. Similarly, in Step 710, cloud data store 206 stores the full history of values including the current values of the transactional data. At Step 715, the transactional data is extracted from the respective data stores and validated by validation rules engine 208. As discussed above, validation rules can include more or more of the following: 1) static limits; 2) single value thresholds; 3) percentage of value change; 4) percentage of difference to related data objects; 5) range of standard deviation; 6) slope rate differential; 7) numeric value threshold; 8) object maturity (completeness); and the like. If one item of transactional data or a series of transactional data fails the validation requirements, then the data is declared invalid triggering an appropriate response (Step 720). In the exemplary embodiment, the triggered event is responded to on a custom basis in which typical responses include, for example, excluding the failed data point, notifying an operator, making a system notation for later, or alerting an operator. Once all the data has passed the required validation rules, energy management control center 102 reinserts the transactional data into the cloud data store 206 and synchronizes it to the unifying data warehouse 210 (Step 725).

At Step 730, the validated transactional data is used as raw data to create new calculated data. For example, Step 730 includes simple calculations performed by optimization engine 212 such as addition and subtraction or complex math with the use of parenthesis. Preferably, all calculations are performed in the P.D.M.A.S. (parenthesis, division, multiplication, addition, subtraction) order of operations. It should be appreciated, however, that any appropriate order of calculations can be used. At this point, the data analysis splits into two parallel paths which can be performed serially or concurrently. Specifically, at Step 735, campaign platform 214 scans the unifying data warehouse 210 to determine involvement in active campaigns. The new valid data and calculated data are used to update the current standings of campaigns. Furthermore, at Step 740, operational rules engine 216 identifies active business rules (i.e., "If Then Else" logic chains) and executes them in proper operational order. Finally, at Step 745, the optimization results are generated and appropriate controlling instructions are transmitted to all subscribed members connected to energy management system 100 via the service and delivery platform 218 (see Steps 535-545 of FIG. 6).

In one exemplary implementation of energy management system 100, energy management control center 102 can be used to support utility demand response programs for load controlling of major appliances such as end user refrigerators and water heaters. For example, these appliances can be turned off for brief intervals of time upon receiving an instruction signal while not jeopardizing the safety of the refrigerator contents.

For example, refrigerator optimization can be achieved using USLCD controllers 304, such as USLCD 120 or 220 volt plugs. The hardware sensors of sensor array 502 in these USLCD controllers are configured to measure the consuming kW of the outlet for purposes of determining the active cycle of the refrigerator. The measured active cycle data is then transmitted to energy management computer 302 and ultimately to the unifying data warehouse 210 of the energy management control center 102.

The recommended settings for the internal refrigerator controls are determined by correlating incoming data streams with model information collected about the appliance during the installation process of premise automation network 300. These recommended settings generated by energy management control center 102 are in turn communicated to energy management computer 302 of the end user. Due to the significant variety of refrigerator makes and models, the end user is asked to make these refrigerator temperature setting adjustments manually. The proper settings take into account the usage of the kitchen as a room, the outside climate conditions, HVAC settings, etc.

Moreover, the data collected by the USLCD controllers 304 allows for an analysis of user operation cycles of the particular appliances to which they are connected (i.e., a refrigerator, water heater, dish washer, clothes washer, etc.) based on the current draw data from the USLCD controller 304. Energy management control center 102 is therefore able to see the scheduled and actual operation of the end user appliances. From this observation and other behavioral data, energy management control center 102 is configured to make recommendations to energy management computer 302 in the form of controlling instruction signals on scheduling of appliance operations for more effective conservation and energy optimization.

Because energy management system 100 is designed to utilize unifying data warehouse 210, which stores the type and distance of relationship of one sensor, device, mobile client or controller to another sensor, device, mobile client or controller, energy management system 100 has a larger scope of control for connected (via sensor, device, mobile client or controller) assets. As a result, the decision logic can take into account the state/value of other connected sensors, devices, mobile clients or controllers. This allows more complex machine intelligence to be utilized in the control of assets as well as enabling home or commercial premise assets to be controlled in manner that is more reflective of a system of assets working in concert than separate assets. The effect of these assets working in concert is lower energy bills, more efficient operation, and lower energy consumption and demand. Further since energy management system 100 is an ongoing system, the efficiency and cost gains made by energy management system 100 are able to be sustained over time unlike status quo one time analysis that slowly lose effectiveness over time. Furthermore, since energy management system 100 has the ability to store information overtime, it can also be used in this fashion as an asset management platform for either home or commercial use. Data from energy management system 100 can be used to correlate and infer when actual maintenance is required creating a "on-demand" maintenance program instead of the status quo scheduled maintenance program.

In addition, because energy management system 100 is designed to utilize the unifying data warehouse 210, which stores the type and distance of relationship of one sensor, device, mobile client or controller to another sensor, device, mobile client or controller, energy management system 100 can calculate and determine what the influence of multiple energy savings projects or actions. This is so because energy management system 100 can identify the correlations between different assets via unifying data warehouse 210. The calculations for this analysis utilizes the standard mathematical function of correlation coefficient on a broad scale.

While the foregoing has been described in conjunction with an exemplary embodiment, it is understood that the term "exemplary" is merely meant as an example. Accordingly, the application is intended to cover alternatives, modifications and equivalents, which may be included within the spirit and scope of the energy management system and method disclosed herein.

Additionally, in the preceding detailed description, numerous specific details have been set forth in order to provide a thorough understanding of the present invention. However, it should be apparent to one of ordinary skill in the art that the energy management system and method may be practiced without these specific details. In other instances, well-known methods, procedures, components, and circuits have not been described in detail so as not to unnecessarily obscure aspects of the energy management system and method disclosed herein.

What is claimed is:

1. An energy management system for efficiently and continuously managing energy consumption and operation performance of a premises, the system comprising:

an energy consumption controller associated with the premises and configured to repeatedly gather current energy consumption data from at least one electrical component associated with the premises; and a control center communicatively coupled to the energy consumption controller and configured to:
continuously receive the current energy consumption data gathered by the energy consumption controller,
store the received current energy consumption data as historical energy consumption data,
analyze the historical energy consumption data to: (i) determine performance conditions of the at least one electrical component, and (ii) learn operating patterns of the at least one electrical component,
perform data analysis operations using the current energy consumption data, the performance conditions data and the operating patterns of the least one electrical component, and data not gathered by the energy consumption controller, and
dynamically generate instructions for optimizing energy efficiency, reliability and life expectancy of the at least one electrical component based the data analysis operations,
wherein the data not gathered includes data unrelated to the energy consumption data.

2. The energy management system of claim 1, further comprising a server configured to transmit the instructions to the energy consumption controller.

3. The energy management system of claim 2, wherein the energy consumption controller is further configured to control the at least one electrical component based on the instructions.

4. The energy management system of claim 2, wherein the server is further configured to receive energy consumption rules from a user of the at least one electrical component.

5. The energy management system of claim 4, wherein the control center is further configured to generate the instructions for optimizing energy efficiency, reliability and life expectancy of the at least one electrical component based on the energy consumption rules.

6. The energy management system of claim 1, wherein the at least one electrical component is an appliance.

7. The energy management system of claim 1, wherein the data not gathered by the energy consumption controller is selected from the group consisting of user preferences, energy market conditions, weather conditions, grid infrastructure constraints and regulatory mandates.

8. The energy management system of claim 1, wherein the energy consumption data further includes ambient temperature of the location of the respective electrical component, and occupancy of the room where the respective electrical component is located.

9. The energy management system of claim 1, wherein the control center is further configured to dynamically generate second instructions for controlling another electrical component associated with the premises, the second instructions being based on the data analysis operations using at least the current energy consumption data of the at least one electrical component.

10. The energy management system of claim 9, wherein the second instructions control the other electrical component to store or generate energy.

11. The energy management system of claim 1, wherein the instructions control the at least one electrical component to optimize energy use based on the performance conditions and use of the at least one electrical component.

12. An energy management system for efficiently and continuously managing energy consumption and operational performance at a premises, the system comprising:
a server configured to continuously receive current energy consumption data from an energy consumption controller associated with at least one electrical component associated with the premises; and
a computer coupled to the server and configured to:
store the received current energy consumption data as historical energy consumption data,
analyze the historical energy consumption data to: (i) determine performance conditions of the at least one electrical component, and (ii) learn operating patterns of the at least one electrical component,
perform data analysis operations using the current energy consumption data, the performance conditions data and the operating patterns of the least one electrical component, and data not from the energy consumption controller, and
dynamically generate instructions for optimizing energy efficiency, reliability and life expectancy of the at least one electrical component based the data analysis operations.

13. The energy management system of claim 12, wherein the server is further configured to transmit the instructions to the energy consumption controller.

14. The energy management system of claim 13, further comprising a data warehouse configured to store the historical energy consumption data and the data not from the at least one energy consumption controller.

15. The energy management system of claim 14, wherein the control center is further configured to analyze the current and historical energy consumption data and the data not from the at least one energy consumption controller, and to generate the instructions for optimizing energy efficiency, reliability and life expectancy of based on the analyzed data so as to optimize energy consumption of the at least one electrical component.

16. The energy management system of claim 12, wherein the data not from the energy consumption controller is selected from the group consisting of user preferences, energy market conditions, weather conditions, grid infrastructure constraints and regulatory mandates.

17. The energy management system of claim 12, wherein the control center is further configured to validate the energy consumption data by at least one of the following criteria: static limits, single value thresholds, percentage of value change, percentage of difference to related data objects, range of standard deviation, slope rate differential, numeric value threshold, and object maturity.

18. The energy management system of claim 12, wherein the energy consumption data further includes ambient temperature of the location of the respective electrical component, and occupancy of the room where the respective electrical component is located.

19. An energy management method for efficiently and continuously managing energy consumption and operational performance of a premises, the method comprising:
receiving, by a server, current energy consumption data from an energy consumption controller associated with at least one electrical component at the premises;
storing, in a data warehouse, the received current energy consumption data as historical energy consumption data,
analyzing, by a hardware processor, the historical energy consumption data to: (i) determine performance conditions of the at least one electrical component, and (ii) learn operating patterns of the at least one electrical component,
performing, by the hardware processor, data analysis operations using the current energy consumption data, the performance conditions data and the operating patterns of the least one electrical component, and data not from the at least one energy consumption controller; and dynamically generating, by the hardware processor, instructions for optimizing energy efficiency, reliability and life expectancy of the at least one electrical component based on the data analysis operations.

20. The energy management method of claim 19, further comprising transmitting, by the server, the instructions to the energy consumption controller.

21. The energy management method of claim 19, further comprising storing, in the data warehouse, the historical energy consumption data and the data not from the energy consumption controller.

22. The energy management method of claim 21, further comprising:

analyzing, by the hardware processor, the current and historical energy consumption data and the data not from the at least one energy consumption controller; and generating, by the hardware processor, the instructions for optimizing energy efficiency, reliability and life expectancy of based on the analyzed data so as to optimize energy consumption of the at least one electrical component.

23. The energy management method of claim 22, further comprising correlating, by the hardware processor, the analyzed data with other data from the premise so as to optimize overall energy consumption at the premises.

24. The energy management method of claim 19, wherein the energy consumption data further includes ambient temperature of the location of the respective electrical component, and occupancy of the room where the respective electrical component is located.

* * * * *